UNITED STATES PATENT OFFICE.

THEODORE D. LICHTENSTEIN, OF SILVERTOWN, NEAR LONDON, ENGLAND.

PRODUCT OF CARAMEL.

No. 829,478.  Specification of Letters Patent.  Patented Aug. 28, 1906.

Application filed October 9, 1905. Serial No. 282,013.

*To all whom it may concern:*

Be it known that I, THEODORE DAVID LICHTENSTEIN, chemical manufacturer, a subject of the King of the British Dominions, residing at Silvertown, near London, England, have invented a certain new and useful Chemical Compound or Product of Caramel and Process for Producing the Same, of which the following is a specification.

My invention relates to the production of new compounds from or with caramel. I take caramel, which is the product of the desaccharization, by heat or by heat and certain chemical substances, of sugar, glucose, molasses, or similar saccharine or carbohydrate matter. I combine the caramel with a boron compound, such as borate of potash, soda, or ammonia.

In carrying my invention into effect I add to an aqueous solution of caramel, at a specific gravity of about 1.400 and a temperature of about 90° centigrade, from ten to fifteen per cent. of melted meta-borate of soda and stir the mixture. Violent chemical reaction takes place, and the mixture increases in bulk, subsides, and solidifies. I may moderate or control the reaction by adding to the caramel about twenty per cent. of water or by adding the borate in aqueous solution and by lowering the temperature. The product thus obtained is a thick paste, which is afterward packed in closed vessels for use, or it is allowed to dry, when it may be ground to powder.

I have described the caramel suitable for my invention as desaccharized in order to indicate that an under-desaccharized or an over-desaccharized material is less suitable. Caramel is desaccharized if the conversion of sugar into caramel has been carried just far enough for the complete destruction of the characteristic properties of sugar, such as sweetness, reducing power, and rotation of rays of polarized light. The degree of saccharization may be ascertained by subjecting a sample to Fehling's test or other known tests. Pure caramel—that is, the product after the caramel has been purified by dialysis—gives a better result with less borate than ordinary undialyzed caramel; but it is not necessary to employ pure caramel for all my purposes, nor do I confine myself to the proportions and method given above.

The compound or composition obtained as described is in its dry condition a hard black substance which may be ground to a powder and is soluble in water. When moist, it naturally and readily throws off the water in contact with atmospheric air and becomes dry, unlike ordinary caramel, which is always more or less hygroscopic. When mixed with a suitable quantity of water, it has high adhesive or agglutinating properties, and it is suitable for many purposes for which ordinary caramel cannot be used—for instance, as a backing for photographic negatives to prevent what is known to photographers as "halation."

What I claim is—

1. As a new chemical product, a boro compound of caramel, being in its dry condition a hard black substance soluble in water, and when mixed with water possessing high adhesive properties and readily giving off its water to the air, substantially as described.

2. The process for the production of a boro compound of caramel, which consists in causing a borate to act on caramel with the aid of heat, substantially as described.

3. The process for the production of a boro compound of caramel, which consists in causing a borate to act on dialyzed caramel with the aid of heat, substantially as described.

4. The process for the production of a boro compound of caramel, which consists in causing a melted borate to act on an aqueous solution of dialyzed caramel with the aid of heat, substantially as described.

5. The process for the production of a boro compound of caramel, which consists in mixing melted meta-borate of soda with a hot aqueous solution of caramel, and allowing the said materials to act upon each other, substantially as described.

In witness whereof I have set my hand hereunto in the presence of two subscribing witnesses.

THEO. D. LICHTENSTEIN.

Witnesses:
 EDWARD LE VIR,
 GUSTAVE GEORGE GROS.